July 24, 1962 J. H. AUER, JR., ET AL 3,046,544
MOUNTING MEANS FOR ELECTRO-ULTRASONIC TRANSDUCERS
Filed Feb. 12, 1960 2 Sheets-Sheet 1
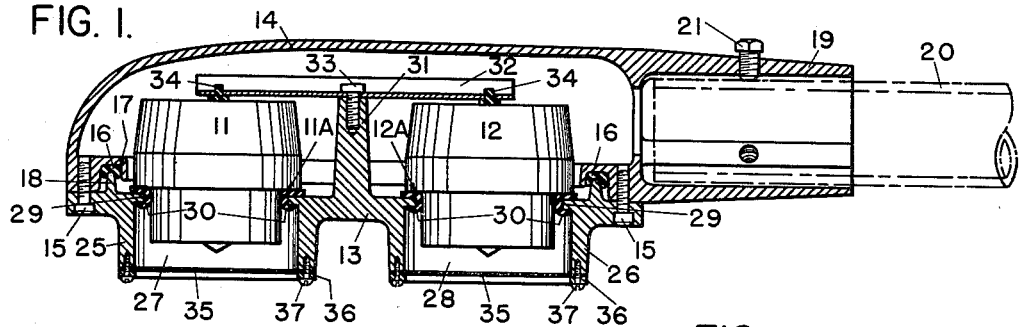
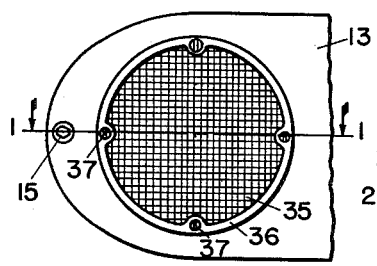
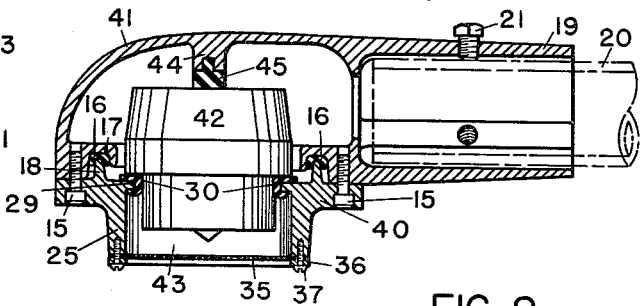
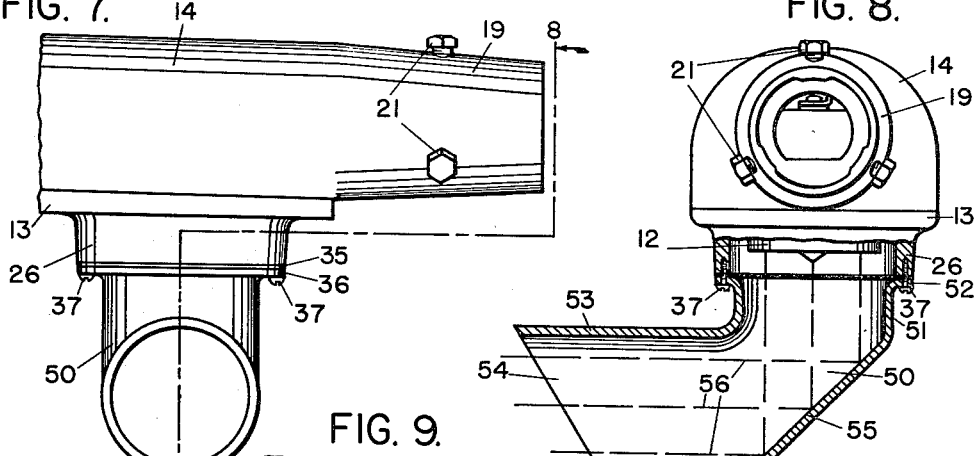
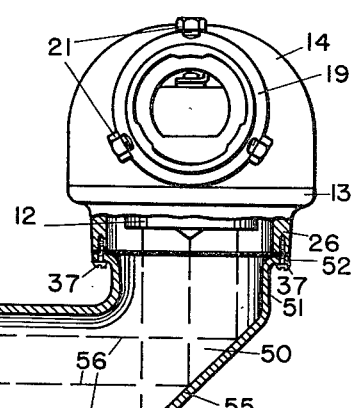
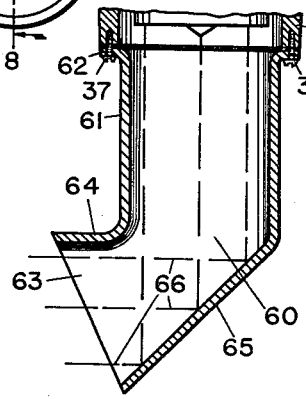
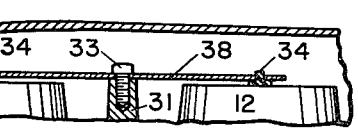
INVENTORS
N.A. BOLTON, J.H. AUER JR.
H.C. KENDALL AND
BY R.A. HAGEN
*Forest B. Hitchcock*
THEIR ATTORNEY

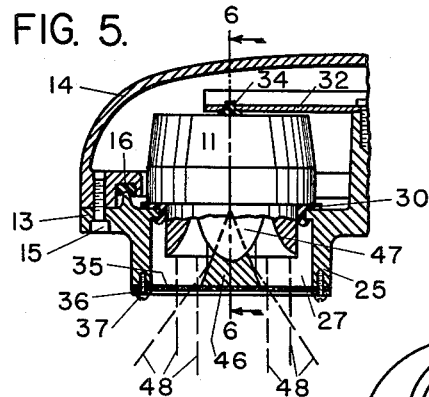
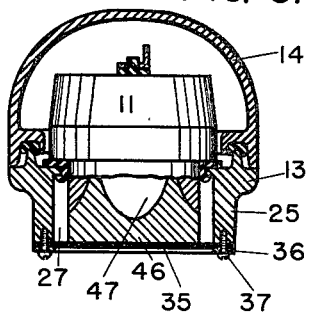
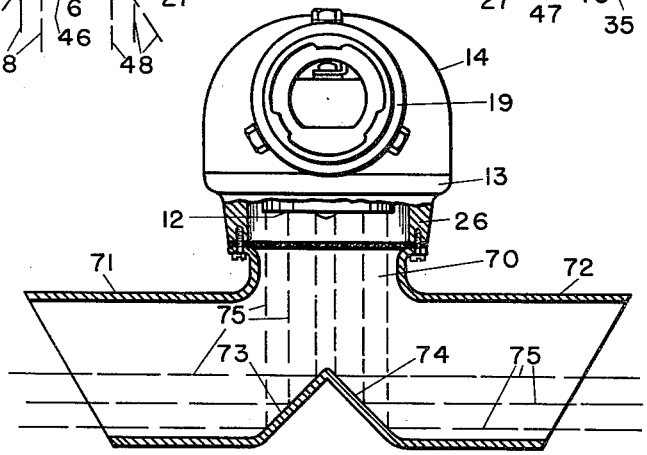
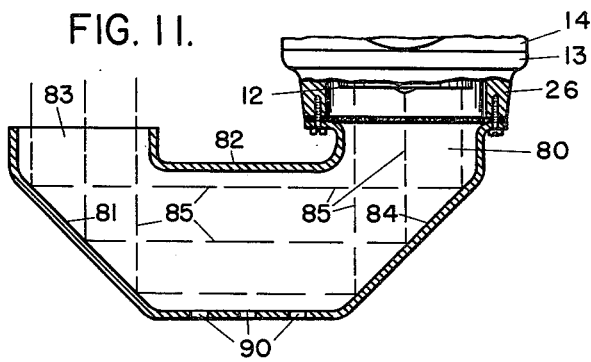
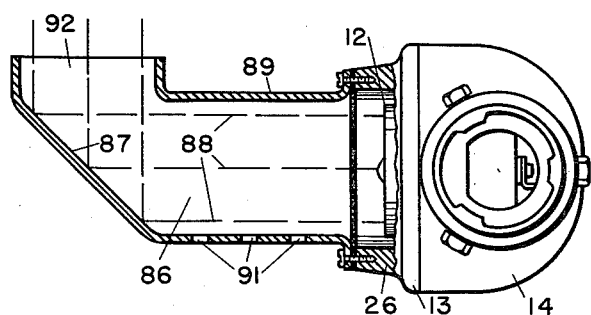

3,046,544
MOUNTING MEANS FOR ELECTRO-ULTRA-SONIC TRANSDUCERS

John H. Auer, Jr., Rochester, Norman A. Bolton, Scottsville, and Hugh C. Kendall and Robert A. Hagen, Rochester, N.Y., assignors to General Railway Signal Company, Rochester, N.Y.
Filed Feb. 12, 1960, Ser. No. 8,314
3 Claims. (Cl. 340—388)

This invention relates to a mounting means for electro-ultrasonic transducers, and more particularly relates to the type of transducers which are mounted in parking garages or on highways for detecting the passage of vehicles by the transmission and reflection of ultrasonic energy.

In such systems, as for example, the vehicle detecting system disclosed in our co-pending application Ser. No. 808,736, filed April 24, 1959, wherein the detection means is dependent upon the transmission and reflection of ultrasonic waves, it is highly desirable that any foreign sounds, vibrations or shocks should not be diverted through the transducer structures themselves and cause extraneous effects. Also, the transducers must be protected from insects, birds and the like, as well as adverse weather conditions, yet must be exposed to atmosphere in order to transmit and pick up ultrasonic waves.

The present invention provides a means wherein the transducers are mounted within a durable metallic casing and yet are completely rubber insulated from direct contact with any part of the metallic casing. Also, the openings within the casing for permitting the passage of ultrasonic waves to and from the transducers are suitably covered with fine mesh screening to prevent snow, sleet, insects or the like, from covering the horn and diaphragm of each transducer.

More specifically and in general, the transducer mounting means of the present invention provides a two piece casing having a substantially half egg-shaped cover shell and a flat base portion bolted together with a rubber gasket therebetween. The cover portion of the casing is provided with an extending hollow flange at one end to facilitate connection to a pole although it is obvious that other types of connections could be utilized. The base portion of the casing is provided with circular flanged openings protruding from its outer surface into which the transducers are mounted from the inside thereof.

Each transducer unit lies within and rests upon a rubber gasket and is held in position by a rubber pad bearing against the back or top thereof. The front or diaphragm and horn end of each of the transducers protrudes into its respective flanged opening and is exposed to atmosphere through the screened end thereof.

The structural features thus briefly described may be embodied in a structure designed for one, two or more transducers. The present disclosure has shown structures for one and two transducers as illustrative of the structural features involved.

This structure for mounting the transducers within a suitable casing is also adaptable to different types of directive horns. When constructed without an attached horn, the ultrasonic waves are directed away from the transducer in a generally circular pattern of limited circumference; but it is obvious that by changing the shapes of the horns that different patterns of sound beams may be transmitted and received. It is also possible to direct the beams of sound through varying angles. One angle of which has particularly been found to be useful is an angle of approximately 90 degrees. Also, by suitably constructing the horn, the beams may be split so as to be directed in two directions which may vary through any suitably desired angle from approximately 40° up to 180°.

The features of the mounting means for electro-ultrasonic transducers which are disclosed in FIGS. 4 through 12 hereof, have been disclosed and claimed in the divisional application Ser. No. 182,574, filed March 26 1962.

Other objects, purposes and characteristic features of the invention will be pointed out as the description of the invention progresses with reference to the drawings in which:

FIG. 1 is a side elevational sectional view of the transducer mounting means of the present invention as partially indicated by the line 1—1 of FIG. 2 and shows the two piece casing structure with two transducers mounted therein for downward ultrasonic wave reflection and a pole arm support for the casing as indicated by do and dash lines;

FIG. 2 is a partial bottom view of the base portion of the mounting casing of the present invention shown in FIG. 1 and shows one of the screened openings;

FIG. 3 is a sectional view of a modified form of the hold-down means for the transducers shown in FIG. 1 wherein the hold-down bracket is resilient rather than rigid;

FIG. 4 is a view similar to FIG. 1 except that it shows a form of the present invention wherein mounting is provided for only one transducer;

FIGS. 5 and 6 are two sectional views of a mounted transducer as shown in FIGS. 1 and 4 and include a knife edge wedge for deflecting the ultrasonic wave reflections into two different paths, FIG. 6 being taken on the line 6—6 of FIG. 5;

FIG. 7 is a partial side elevational view of the apparatus shown in FIG. 1 in a modified form which include a reflector horn for directing the ultrasonic waves from a downward to a right angular direction;

FIG. 8 is an end view partially in section as indicated by the line 8—8 of FIG. 7 and shows the modified form of the reflector horn shown in FIG. 7;

FIG. 9 is a sectional view showing a further modified form of a reflector horn as shown in FIG. 8 for directing the ultrasonic waves to a right angular direction;

FIG. 10 is a partial sectional view showing a further modified form of a reflector horn partially similar to that shown in FIG. 8 except that the ultrasonic waves are directed to two opposite right angular directions;

FIG. 11 is a partial sectional view showing a further modified form of a reflector horn partially similar to tha shown in FIG. 8 except that it provides an additiona ninety degree directive surface so that the combination of the two ninety degree deflections direct the ultrasoni waves through a one hundred and eighty degree angl and upward; and FIG. 12 is a partial sectional view showing a furthe modified form of a reflector horn for directing the ultra sonic waves upward as shown in FIG. 11 except that th unit as a whole is similar to that shown in FIG. 9 but i mounted on its side with respect to a horizontal plane Referring now to FIGS. 1 and 2 of the drawings, th two piece casing for housing the transducers 11 and 1: comprises a base portion 13 and a cover portion 14. Th transducers 11 and 12 are wholly mounted and supporte on the base 13, after which the cover 14 is fastened there to by means of screws 15. A rubber gasket 16 lies in groove 17 within the periphery of the cover 14 and reg isters with a raised rib 18 around the periphery of th base 13, thus forming a seal between the two parts of th casing when united. The cover 14 is provided with a extended circular flange 19 which has an opening therei to accommodate an extending pipe 20 as shown by do and dash lines, to provide a means for mounting th casing. The casing may be locked on the pipe 20 in the correct angular position by means of the set screws 21. The present invention is particularly concerned with the mechanical mounting of a transducer or transducers in a housing and, for this reason, electrical connections to the various transducers have not been shown in the drawings. It will be appreciated that each transducer ordinarily has at least two terminals to which a pair of wires may be connected and which may pass through the pipe 20 (see FIGURE 1) to the housing interior.

The base 13 is provided with two downwardly extending circular flanges 25 and 26 which are provided with round openings 27 and 28 respectively therethrough. The inner end of each of the openings 27 and 28 is provided with an inwardly extending circular rib 29 onto which is fitted a circular gasket 30 of general channel shape in cross section, thus completely enclosing the rib 29. The transducers 11 and 12 are inserted within their respective openings 27 and 28 until they rest on their respective shoulder portions 11A and 12A, the horn end of the transducers extending well within the circular openings 27 and 28. These transducers 11 and 12 may be of any standard commercial make and no attempt has been made herein to show detailed structure. It should be understood, however, that the proportional size of the mounting parts just described may be modified to fit the size and shape of the particular transducer used in assembly.

The base 13 is also provided with an upwardly extending boss or lug 31 to which is fastened an angle bracket 32 by means of a screw 33. This angle bracket 32 extends over the center portion of each of the transducers 11 and 12 and is provided with two rubber pads 34 suitably attached to the bottom side thereof. These rubber pads 34 are located directly over the center of the transducers 11 and 12 and bear against them when the screw 33 is tightened down. The openings 27 and 28 are covered at their outer ends with metal mesh screens 35 which are held in place by means of bezel rings 36 and screws 37.

Thus, from the description given thus far and with reference to the drawings, it can be seen that a resilient rubber mounting has been provided for the transducer elements 11 and 12 wherein the heavy duty casing in which they are mounted does not come in contact therewith at any point. Furthermore, the transducer elements 11 and 12 are completely mounted on and held by the base portion 13 alone, thus facilitating assembly and removal of the operating unit without disturbing the basic structure. Also, the transducer elements 11 and 12 are completely protected from weather and other foreign elements.

Referring now to FIG. 3, there has been shown a resilient leaf spring 38 in place of the rigid angle bracket 32 shown in FIG. 1. Although the rubber pads 34 on the rigid angle bracket 32 are adequate to hold and absorb all shocks to the transducers 11 and 12, the resilient leaf spring 38 provides further shock proof qualities.

The structure and mounting means shown in FIG. 1 includes two transducers 11 and 12 as already mentioned and the device may be used in a system as previously referred to wherein one transducer transmits the sound waves whereas the other transducer picks up the reflected sound waves. There are instances, however, where certain systems only require one transducer to both transmit and receive such sound waves.

FIG. 4 shows such a form of the invention wherein only one transducer is mounted in the supporting housing. The structure is practically identical except that the base 40 and the cover 41 are shorter in length and the means for holding the transducer 42 down in position within its gasket 30 and opening 43 is different. In this modified form the cover 41 is provided with a downwardly extending boss or lug 44 onto which an enlarged rubber pad 45 is suitably fastened for cooperation with the top of the transducer 42.

Thus, in this form of the invention, the transducer 42 is not firmly held into position until the base portion 40 is fastened to the cover portion 41 by the screws 15, whereupon the rubber pad 45 bears against the transducer 42. As the remainder of the transducer mounting and the structure is the same as that already described in connection with FIG. 1, it will not be repeated but the same reference characters have been used on the drawing.

Referring now to FIGS. 5 and 6, there has been shown a means for dividing and reflecting the ultrasonic waves into two separate angular paths so that an individual transducer unit may detect vehicles in two separate side by side traffic lanes. In this form of the invention, the detector head structure and the transducer unit mounting means is exactly the same as that already described in connection with FIG. 1 and it is believed that no further description is needed although the same reference characters have been used on the drawings.

The means for dividing and reflecting the ultrasonic waves into two separate paths comprises a knife edge wedge block 46 which is inserted crosswise through the center of the opening 27 and positioned between the horn inner member 47 of the transducer unit 11 and the protective screen 35. This wedge block 46 has its knife edge at the top next to the diaphragm and horn member 47 whereas its wide base portion bears on the screen 35. Thus, the ultrasonic waves indicated by the dash lines 48 are directed from the transducer horn downward and outward at a slight angle with respect to a vertical plane, so as to cover the vehicles in two separate parallel lanes.

The structure and mounting means for the transducers shown and described in the main form of the invention shown in FIGS. 1, 2 and 4 are used in an overhead detecting system wherein it is desired to detect vehicles passing under the detectors. It is also desirable in some systems to detect vehicles from the side as they pass certain points. The modifications shown in FIGS. 7, 8 and 9 propose structures similar to those already disclosed except that the ultrasonic waves may be deflected through an approximate ninety degree angle while the detector head assembly itself is still mounted in an upright position for protective purposes as already explained.

With particular reference to FIGS. 7 and 8, the bezel ring 36 of FIG. 1 is replaced by a deflector horn 50 which is of substantial elbow shape having a short neck 51 on its flanged end 52 next to the detector head assembly and a long neck 53 at its open end 54 which extends outwards at right angles to the detector head assembly. The open end 54 of this long neck portion 53 is formed on an angle with the long portion at the top to help prevent snow, ice and the like from entering the open end 54. The back portion 55 of this elbow shaped deflector horn 50 is flat and smooth to form an angular surface whereon the sound waves illustrated by the dash lines 56 may be directed at an approximate ninety degree angle as previously mentioned.

The further modified form of an angular deflector horn as shown in FIG. 9 is similar to that shown in FIG. 8 except that the elbow shaped deflector horn 60 is provided with a long neck portion 61 on its flanged end 62 whereas its open end 63 is provided with a short neck portion 64. The object in this form is to keep the deflector horn under and within the limits of the size of the detector head assembly to prevent protruding therefrom and possible damage thereto by passing vehicles. Otherwise, the structure is similar to that shown in FIG. 8, the back angular portion 65 directing the sound waves 66 in a like manner.

FIG. 10 shows another modified form of an angular deflector horn which is somewhat similar to that shown in FIG. 8 except that it provides a means for directing the ultrasonic waves into two approximately ninety degree angular directions which are opposite to each other.

The deflector horn 70 is provided with two neck portions 71 and 72 which extend outward in opposite directions at approximate right angles to the detector head assembly. Two deflection surfaces 73 and 74 are provided, each directing a certain quantity of the ultrasonic waves illustrated by the dash lines 75 in respective directions. Thus, when the detector head is placed between two parallel lanes of traffic, the ultrasonic transducer element 12 is capable of detecting vehicles in both traffic lanes.

FIGS. 11 and 12 show further modified forms of angular deflector horns which are adapted for detecting vehicles from underneath or for detecting airplanes overhead.

The deflector horn 80 shown in FIG. 11 is somewhat similar to that shown in FIG. 8 except that an additional ninety degree deflector surface 81 has been added to the open end of the neck portion 82, thus positioning the open end 83 in an upward direction. The other deflecting surface 84 is the same as that shown in FIG. 8. Thus, it can be seen that the ultrasonic waves illustrated by the dash lines 85 can be directed from a downward direction through a complete approximate one hundred and eighty degrees to an upward direction by the two deflecting surfaces 84 and 81.

FIG. 12 illustrates another upward direction deflecting horn arrangement wherein the deflector horn 86 is approximately the same as that shown in FIG. 9, having only one angular deflecting surface 87 therein. However, in this form, the complete detector head assembly is turned at right angles and mounted on its side with respect to a horizontal plane. Thus, the ultrasonic waves indicated by the dash lines 88 may be directed upward with a minimum of deflecting surfaces.

With respect to the upward deflector horns 80 and 86 shown in FIGS. 11 and 12, their respective neck portions 82 and 89 are provided with drain holes 90 and 91 respectively in their lower walls to prevent the accumulation of rain, sleet or the like. Furthermore, although not shown on the drawings, these deflector horns may be provided with electric heating elements or equivalent apparatus to melt away any accumulation of snow or ice that may enter their respective openings 83 and 92.

From the foregoing description and with reference to the accompanying drawings, it can be seen and understood that the main form of the present invention provides a means for mounting transducer units in a metallic casing wherein the ultrasonic transducers are completely rubber insulated from the casing and are also protected from the weather elements, yet are suitably exposed to atmosphere to permit the transmitting and receiving of reflected ultrasonic waves to and from passing vehicles. Also, means have been disclosed for directing the path of the ultrasonic waves either downward from the housing assembly as a whole or separating them into two downward paths. Further means have been disclosed for directing the path of the ultrasonic waves at right angles to the housing assembly in either one or two directions and also in an upward direction. Furthermore, the portion of housing assembly to which the transducer unit are mounted may easily be detached from the main housing assembly and its mounting means for quick inspection, repair or replacement.

Although the structures have been described as employed for the transmission and reception of ultrasonic waves in particular directions, it is to be understood that they may be mounted at any suitable angles to direct or receive ultrasonic waves from any desired direction.

Having shown and described a main form and modifications thereof which the present invention can assume it is desired to be understood that various other forms adaptations, alterations and modifications may be incorporated to meet the requirements of practice except a limited by the scope of the appending claims.

What we claim is:

1. In combination, an electro-acoustic transducer, a housing adapted to contain and support said transduce and having a base plate with an aperture defined therein an elastic resilient gasket lining said aperture, said trans ducer having an orifice adapted to lie above said apertur and having a rim which surrounds said orifice and rest upon said resilient gasket, and means connected to sai housing and including a resilient pad cushioning said trans ducer and forcing said rim of said transducer tightl against said resilient gasket, whereby a weathertight sea is provided between said transducer and said base plat and mechanical vibrations are prevented from bein transmitted between said housing and said transducer.

2. The combination of claim 1 in which said mean comprises a leaf spring affixed at one end to said housin and having said resilient pad at its other end.

3. The combination of claim 1 in which said mean comprises a depending boss integral with said housing an supporting said resilient pad.

References Cited in the file of this patent

UNITED STATES PATENTS

| | | |
|---|---|---|
| 2,073,667 | Williams | Mar. 16, 193 |
| 2,307,247 | Tuck et al. | Jan. 5, 194 |
| 2,645,705 | Rutledge | July 14, 195 |
| 2,790,164 | Oberg | Apr. 23, 195 |
| 2,832,952 | Bagno | Apr. 29, 195 |
| 2,903,626 | Nye et al. | Sept. 8, 195 |

FOREIGN PATENTS

| | | |
|---|---|---|
| 11,375 | Great Britain | of 191 |